(No Model.)

J. A. WOOD.
COOKING BOILER.

No. 253,805. Patented Feb. 14, 1882.

WITNESSES
John A. Ellis.
Alex Mahon

INVENTOR
James A. Wood
By Theodor Munger
his ATTORNEY.

UNITED STATES PATENT OFFICE.

JAMES A. WOOD, OF ROCHESTER, NEW YORK.

COOKING-BOILER.

SPECIFICATION forming part of Letters Patent No. 253,805, dated February 14, 1882.

Application filed December 30, 1881. (No model.)

*To all whom it may concern:*

Be it known that I, JAMES A. WOOD, a citizen of the United States, residing at Rochester, in the county of Monroe and State of New York, have invented certain new and useful Improvements in Cooking-Boilers, of which the following is a specification, reference being had therein to the accompanying drawings, in which—

Figure 1:
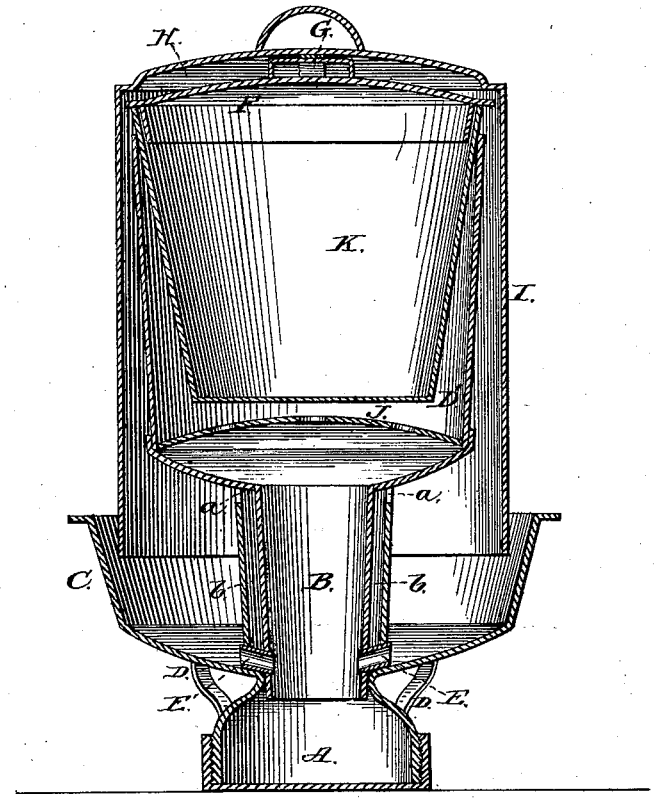
Figure 2:
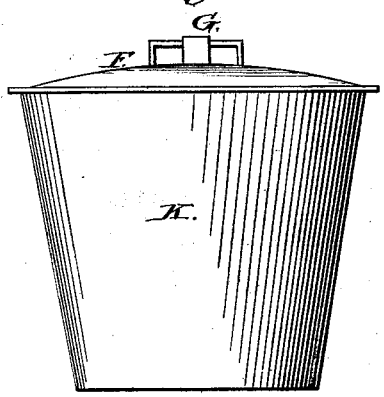

Figure 1 is a vertical sectional view of a boiler embodying my improvements, and Fig. 2 is a side elevation of the removable closed cup.

This invention has relation to improvements in boilers for cooking; and it consists in the novel construction and arrangement of parts hereinafter fully described, and particularly pointed out in the claims.

Referring by letter to the accompanying drawings, A designates a removable threaded base attached to a double-walled flue, B, passing through a cold-water reservoir or pan, C. This pan or reservoir C is preferably supported by braces D. The double-walled flue B is provided near its bottom with pipes E E, connecting the cold-water pan C with the interior of the double-walled flue B.

At the top of the double-walled flue B a receptacle, D', is provided, having a lid, F, loosely fitting therein. This lid F has a central projection, G, which is intended to form a space, H, between it and the top of a condenser, I, which extends down into the water-pan, as shown. The receptacle D' converges from the top toward the bottom, as shown, and a perforated diaphragm, J, is seated in the bottom thereof when the device is employed in cooking vegetables. The double-walled flue B has a series of perforations or openings, *a*, near its upper end, in the outer wall thereof, to permit the escape of the heated air in the space *b* and also to prevent the water in the pan C from becoming heated.

Within the receptacle D' a close or unperforated cup, K, rests, and is adapted to be closed by the same lid, F, that closes the receptacle D'. The condenser I covers the receptacle and conveys the water of condensation from the point where the steam escapes at the lid F back to the cold-water pan. The cup or vessel K is intended for cooking sweetmeats, puddings, bread, and the like, when it is desired to cook the articles without having the steam coming in contact therewith.

The device is to be set on a stove or over a flame to generate the heat required.

This device is cheap and simple and its utility is obvious.

Having thus fully described my invention, what I claim is—

1. In a cooking-boiler, the combination of the removable base, the double-walled flue having the tubes or pipes connecting the interior of the flue B with the water-pan C, the receptacle D', the perforated diaphragm, the cover, and condenser, substantially as specified.

2. In a cooking-boiler, the combination of a steam generator and flue, the receptacle D', the closed cup or vessel K, the lid F, having the projection G, and the condenser I, substantially as specified.

3. In a cooking-boiler, the combination, with the cold-water pan, of the double-walled flue B, having the pipes E E and the perforations *a* in its outer wall, substantially as and for the purposes specified.

In testimony whereof I affix my signature in presence of two witnesses.

J. A. WOOD.

Witnesses:
 THEO. MUNGEN,
 D. E. GRANT.